(12) United States Patent
Gasber

(10) Patent No.: US 9,889,954 B2
(45) Date of Patent: Feb. 13, 2018

(54) METHOD AND PACKAGING PLANT FOR PLACING PRODUCT PACKAGES INTO SHIPMENT CONTAINERS

(71) Applicant: Novartis AG, Basel (CH)

(72) Inventor: Dirk Gasber, Elsenfeld (DE)

(73) Assignee: Novartis AG, Basel (CH)

( * ) Notice: Subject to any disclaimer, the term of this patent is extended or adjusted under 35 U.S.C. 154(b) by 939 days.

(21) Appl. No.: 14/100,298

(22) Filed: Dec. 9, 2013

(65) Prior Publication Data

US 2014/0157732 A1    Jun. 12, 2014

Related U.S. Application Data

(60) Provisional application No. 61/735,589, filed on Dec. 11, 2012.

(51) Int. Cl.
*B65B 5/06* (2006.01)
*B65B 25/00* (2006.01)
(Continued)

(52) U.S. Cl.
CPC ............ *B65B 25/008* (2013.01); *B65B 5/12* (2013.01); *B65B 65/003* (2013.01); *G06Q 10/08* (2013.01);
(Continued)

(58) Field of Classification Search
CPC ....... B65B 5/12; B65B 65/003; B65B 65/006; B65B 25/008; B65B 2210/02; B65B 2210/04; B65B 2210/14; G06Q 50/28; B65G 1/137; B65G 1/1371; B65G 1/1373–1/1378; B65G 57/22

USPC .................. 53/473, 474, 443, 235, 237, 238; 700/213–216, 228–230, 115; 209/552; 414/799, 789.6; 900/7

See application file for complete search history.

(56) References Cited

U.S. PATENT DOCUMENTS 4,692,876 A * 9/1987 Tenma ................. B65G 1/1371
                                                        414/791.6
5,038,283 A * 8/1991 Caveney .............. B65G 1/1371
                                                        235/384
(Continued)

FOREIGN PATENT DOCUMENTS

EP    0765813 A2    4/1997
FR    2754239 A1 *  4/1998   ............... B65B 5/12

OTHER PUBLICATIONS

"Machine translation of FR2754239 A1", translated on Aug. 1, 2016.*

(Continued)

*Primary Examiner* — Stephen F Gerrity
*Assistant Examiner* — Joshua Kotis
(74) *Attorney, Agent, or Firm* — Sheng-Hsin Hu

(57) ABSTRACT

The invention relates to a method and to a packaging plant which allows for a high degree of automatization of the packaging of individual product packages into shipment containers of different sizes and which is at the same time highly reliable and according to this method, each one of the product packages is assigned a conveyance tracking clock information, including information about the type of product package, its respective conveyance track, its conveyance speed, and its predetermined position and orientation within the shipment container for the specific shipment order.

9 Claims, 4 Drawing Sheets

(51) Int. Cl.
  *B65B 5/12* (2006.01)
  *B65B 65/00* (2006.01)
  *G06Q 10/08* (2012.01)
  *G06Q 50/28* (2012.01)

(52) U.S. Cl.
  CPC .......... *G06Q 50/28* (2013.01); *B65B 2210/02* (2013.01); *B65B 2210/04* (2013.01)

(56) References Cited

U.S. PATENT DOCUMENTS

| | | | | |
|---|---|---|---|---|
| 5,211,528 A * | 5/1993 | Kato | ........................ | B23Q 7/00 414/789.6 |
| 5,281,081 A * | 1/1994 | Kato | .................... | B65G 1/1378 414/789.6 |
| 5,363,310 A * | 11/1994 | Haj-Ali-Ahmadi | .... | B65G 1/137 414/273 |
| 5,501,571 A * | 3/1996 | Van Durrett | ........... | B65G 61/00 414/21 |
| 5,706,634 A * | 1/1998 | Edwards | ............ | B29D 11/0024 53/239 |
| 5,720,157 A * | 2/1998 | Ross | ..................... | B65B 25/008 198/349 |
| 5,908,283 A * | 6/1999 | Huang | ................... | B65G 47/90 414/21 |
| 5,934,413 A | 8/1999 | König | | |
| 6,289,260 B1 * | 9/2001 | Bradley | ............... | B65G 1/1373 414/273 |
| 6,505,093 B1 * | 1/2003 | Thatcher | .............. | B65G 1/1376 700/214 |
| 6,560,509 B2 * | 5/2003 | Williams | ............... | G06Q 10/08 700/216 |
| 7,240,465 B2 * | 7/2007 | Davi' | .................... | B25J 9/1697 198/437 |
| 2002/0026768 A1 * | 3/2002 | Duncan | ................ | B65B 25/008 53/52 |
| 2002/0067984 A1 * | 6/2002 | Guenzi | ................ | B65G 1/1376 414/789.6 |
| 2002/0092801 A1 * | 7/2002 | Dominguez | .......... | B07C 5/3412 209/583 |
| 2002/0185358 A1 | 12/2002 | Zeitler | | |
| 2006/0206235 A1 * | 9/2006 | Shakes | ................... | G06Q 10/08 700/216 |
| 2007/0108109 A1 * | 5/2007 | Erlandsson-Warvelin | | B25J 9/1694 209/629 |
| 2007/0125242 A1 * | 6/2007 | Dall'Omo | ............. | B65B 25/146 99/450.4 |
| 2008/0156446 A1 * | 7/2008 | Sekiya | ............... | G06K 19/0723 156/578 |
| 2009/0012644 A1 * | 1/2009 | Stifter | ...................... | B65B 5/12 700/216 |
| 2009/0299521 A1 | 12/2009 | Hansl | | |
| 2010/0305754 A1 | 12/2010 | Ban | | |
| 2011/0295411 A1 * | 12/2011 | Rotella | ................ | G06Q 10/087 700/216 |
| 2013/0041495 A1 * | 2/2013 | Moore | ................... | B25J 9/0084 700/112 |

OTHER PUBLICATIONS

PCT International Search Report dated Sep. 23, 2014, International Application No. PCT/EP2013/075908, International Filing Date Dec. 9, 2013.

PCT Written Opinion of the International Searching Authority dated Sep. 23, 2014, International Application No. PCT/EP2013/075908, International Filing Date Dec. 9, 2013.

* cited by examiner

METHOD AND PACKAGING PLANT FOR PLACING PRODUCT PACKAGES INTO SHIPMENT CONTAINERS

This application claims the benefit under 35 USC § 119 (e) of U.S. provisional application No. 61/735,589 filed Dec. 11, 2012, incorporated by reference in its entirety.

FIELD OF INVENTION

The invention relates to method and to a packaging plant for placing product packages into shipment containers of different sizes.

BACKGROUND

In many industries the prices of products, such as, for example, mass consumer goods, medicines, ophthalmic articles including contact lenses, etc., are affected to a non-negligible extent by the costs for their packaging for distribution to retailers, pharmacies, opticians, etc. In many cases packaging and logistics still involves a large amount of manual labor. Manual packaging and logistic processes of products and customer shipments usually is arduous, monotonous and involves a certain risk of mistakes. Mistakes lead to additional efforts for remedy and in particular for medicines or ophthalmic articles including contact lenses, they should be completely avoided.

Therefore, considerable attempts have been made to automate the packaging of products and product packages into shipment containers for distribution. These attempts have resulted in the introduction of pick-and-place robots in packaging lines. While such more or less automated packaging lines with pick-and-place robots have proven quite reliable for the packaging of large numbers of like products or product packages, they encounter considerable problems when shipment containers of different sizes must be loaded with different types of products and product packages. This is the case, for example, when an order of medicines must be prepared for shipment to a pharmacy or to a consumer. The problems also occur with orders related to ophthalmic products including contact lenses. For example, an order from an ophthalmologist or an optician may include a plurality of contact lenses having different parameters, such as refraction power of the lens, base curve, toricity, etc. Thus, each shipment container usually must be individually packaged with a specific selection of contact lenses having different parameters in accordance with the respective order. Taking further into account that each type of contact lens having the same set of parameters is not only provided in single lens packages but is typically also available in packages comprising multiple contact lenses of the respective type, it is apparent that the task of packaging a shipment container for distribution in accordance with a respective order is quite complicated to perform. Nevertheless, in view of the high volumes of shipments per day which typically must be completed by a distribution center, there exists a strong desire for an automatization of the packaging process.

OBJECTS OF THE INVENTION

It is therefore an object of the present invention to suggest method and a packaging plant which allows for a high degree of automatization of the packaging of individual product packages into shipment containers of different sizes and which is at the same time highly reliable.

It is a further object of the present invention to suggest a method and a packaging plant which allows for optimization of the size of containers to be shipped to customers due to freight charges depending to a considerable extent on the volume of containers to be shipped.

Another object of the present invention is to suggest a method and a packaging plant that relieves the personnel of arduous and monotonous labor and that avoids mistakes during manual packaging and picking.

SUMMARY OF THE INVENTION

In accordance with one aspect of the invention, there is suggested a method for placing product packages each containing one or more products into shipment containers of different sizes, the method including the steps of:

selecting and marking a shipment container of suitable size for a specific shipment order in accordance with the specific shipment order, loading different types of product packages each containing one or more products onto a conveyor system comprising a plurality of separate conveyance tracks, assigning each one of the product packages a conveyance tracking clock information, including information about the type of product package, its respective conveyance track, its conveyance speed, and its predetermined position and orientation within the shipment container for the specific shipment order, forwarding the respective conveyance tracking clock information to a control system, conveying the different types of product packages on the plurality of conveyance tracks to a loading zone comprising at least one loading station each having a pick-and-place robot, within the at least one loading station providing the shipment container for the specific shipment order into which the product packages for this order are to be placed, the shipment container being arranged in a loading position in which the container is resting still, within the at least one loading station by means of the pick-and-place robot picking the product packages for the specific shipment order from the plurality of conveyance tracks and placing the product packages into the shipment container resting still in the loading position, and after completion of the shipment order removing the shipment container from the loading station.

In accordance with a further aspect of the method of the invention, within the at least one loading station a plurality of shipment containers for different orders are resting still in the loading position in side-by-side configuration at the same time, and the pick-and-place robot picks the product packages from the plurality of conveyance tracks and in accordance with the respective shipment order places them into the corresponding one of the plurality of shipment containers resting in the loading position.

According to yet a further aspect of the method of the invention, the different types of product packages to be loaded onto the conveyor system are retrieved from separate storage facilities in accordance with the respective shipment order, and are loaded onto the conveyor system by one of automatic and manual loading.

In accordance with still a further aspect of the method of the invention, the loading zone comprises a plurality of successively arranged loading stations, and further the conveyance tracking code of each one of the product packages comprises an additional information about that loading station of the plurality of successively arranged loading stations in which the automatic picking of the respective product package from the respective conveyance track and the placing of the product package into the shipment container for the specific order is performed.

Still in accordance with a further aspect of the method of the invention, prior to reaching the loading zone the exact position and rotational orientation of the product packages on the respective conveyance tracks are detected, and wherein data corresponding to the detected position and orientation of the product packages are passed on to the control system for controlling the picking and placing of the product packages to the respective shipment container for the specific order.

In accordance with yet a further aspect of the method of the invention, within the at least one loading station a said shipment container is transferred from the loading position to an intermediate storage position if within a preselected time period the said shipment container cannot be completed, and the said shipment container is retrieved again at a later time from the intermediate storage position and is transferred back to the loading position for completion of the shipment container once the required product packages for completing the specific order are loaded onto the conveyor system.

According to a further aspect of the method of the invention, each of the product packages contains a single one or a plurality of ophthalmic lenses, in particular contact lenses, having the same specific combination of lens parameters.

According to still a further aspect of the method of the invention, the step of loading different types of product packages onto the conveyor system comprises continuously loading product packages containing ophthalmic lenses having the most frequently ordered lens parameters onto a plurality of conveyance tracks of the conveyor system, and loading product packages containing ophthalmic lenses having only rarely ordered lens parameters onto one conveyance track of said conveyor system on demand only.

According to a yet further aspect of the method of the invention, each of the plurality of conveyance tracks has the same transport speed.

Still in accordance with a further aspect of the method of the invention, the plurality of conveyance tracks are provided on a single common conveyor belt.

In accordance with another aspect, there is suggested a packaging plant for placing product packages each containing one or more products into shipment containers of different sizes, the packaging plant comprising:

a conveyor system comprising a plurality of separate conveyance tracks for conveying different types of product packages, a conveyor tracking unit for assigning each one of the product packages a conveyance tracking clock information and for forwarding the respective conveyance tracking clock information to a control system, the conveyance tracking clock information including information about the type of product package, its respective conveyance track, its conveyance speed, and its predetermined position and orientation within a shipment container of suitable size for a specific order into which the product package is to be loaded, a loading zone arranged along the conveyor system, the loading zone comprising at least one loading station each having a pick-and-place robot for picking the product packages from the plurality of conveyance tracks and placing them into the shipment container by means of the pick-and-place robot, with the shipment container being arranged in a loading position in the at least one loading station and resting still in the loading position, a transport device for removing the shipment container from the loading station after completion of the shipment order, and a control system for controlling all components of the packaging plant.

According to a further aspect of the packaging plant of the invention, each loading station is adapted to accommodate a plurality of shipment containers in side-by-side arrangement.

In accordance with a still further aspect of the invention, the packaging plant further comprises a plurality of supply lines for loading the different types of product packages to the conveyor system, the supply lines being connected to an automatically operable storage or to a manually operable feed station.

In accordance with yet a further aspect of the packaging plant of the invention, the loading zone comprises a plurality of loading stations, each loading station in addition to the pick-and-place robot having an automatic manipulation robot for moving a respective shipment container from the loading position to an intermediate storage arranged in the loading station, and vice versa.

In accordance with a further aspect of the invention, the packaging plant further comprises a detector arranged to extend transversely to the direction of the conveyance tracks over the entire width of the conveyor system, for detecting the exact positions and rotational orientations of the product packages on the conveyor system and for passing data corresponding to the detected positions and orientations to the control system for controlling the pick-and-place robot in the respective loading station.

BRIEF DESCRIPTION OF THE DRAWINGS

The invention will become apparent from the following description of an exemplary embodiment of the invention with reference the drawings in which.

DETAILED DESCRIPTION OF EMBODIMENTS

While the invention is generally applicable for the automated packaging of different kinds of products it will be described in the following with reference to a packaging plant for the automated packaging of ophthalmic lenses, in particular contact lenses.

Figure 1:
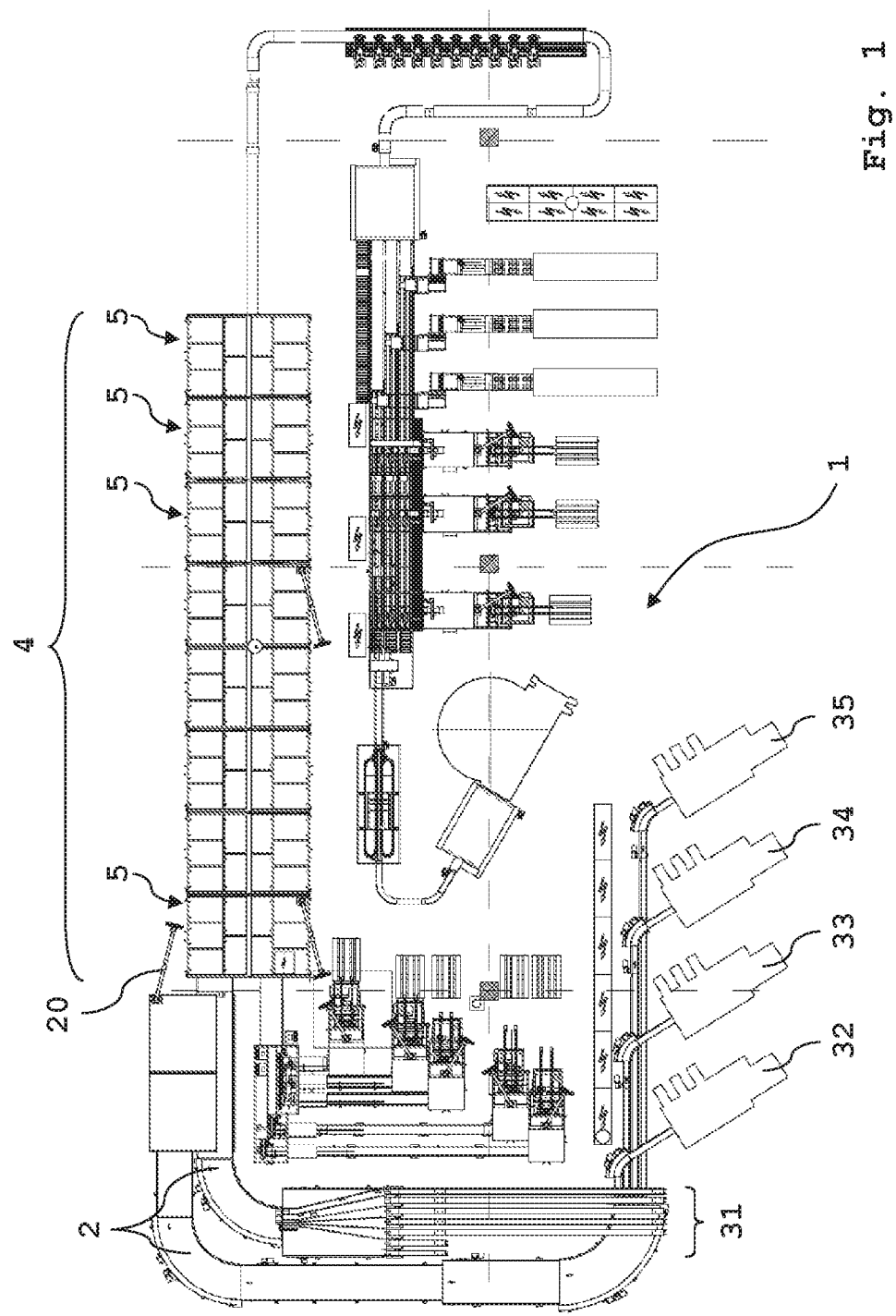
FIG. 1 is an overall view of an embodiment of a packaging plant according to the invention.

FIG. 1 shows a packaging plant 1 for placing product packages containing different types of contact lenses into shipment containers of different sizes in accordance with corresponding shipment orders. Packaging plant 1 includes a conveyor system 2, which is loaded with product packages containing the contact lenses. The product packages are loaded onto the conveyor system 2 via a plurality of supply lines 31 being connected to an automatically operable storage (not shown) and via a plurality of manually operable feed stations 32, 33, 34, 35. Via the manually operable feed stations 32-35 product packages containing contact lenses having less common combinations of lens parameters may be manually (or semi-automatically via the manually operable feed stations) loaded onto conveyor system 2. Product packages containing the most common types of contact lenses (which are ordered most frequently) are automatically loaded onto conveyor system 2 via supply lines 31. A loading zone 4 comprises a plurality of loading stations 5 arranged successively along the conveyor system 2. By way of example, eight such loading stations 5 are shown in FIG. 1. In addition, packaging plant 1 comprises further stations and installations, however, for the understanding of the instant invention they are not of particular relevance and are not described, therefore. As shown in FIG. 1, the conveyor system 2 of this embodiment comprises an arrangement of initially two conveyor belts which are transporting the product packages to a transfer location where the product packages are picked from one of the initially two conveyor belts and are placed onto the other of the initially two conveyor belts, for example with the aid of one or more robots 20, so that only a single conveyor belt extends along the loading zone 4 and conveys the product packages to the respective loading stations 5.

Figure 2:
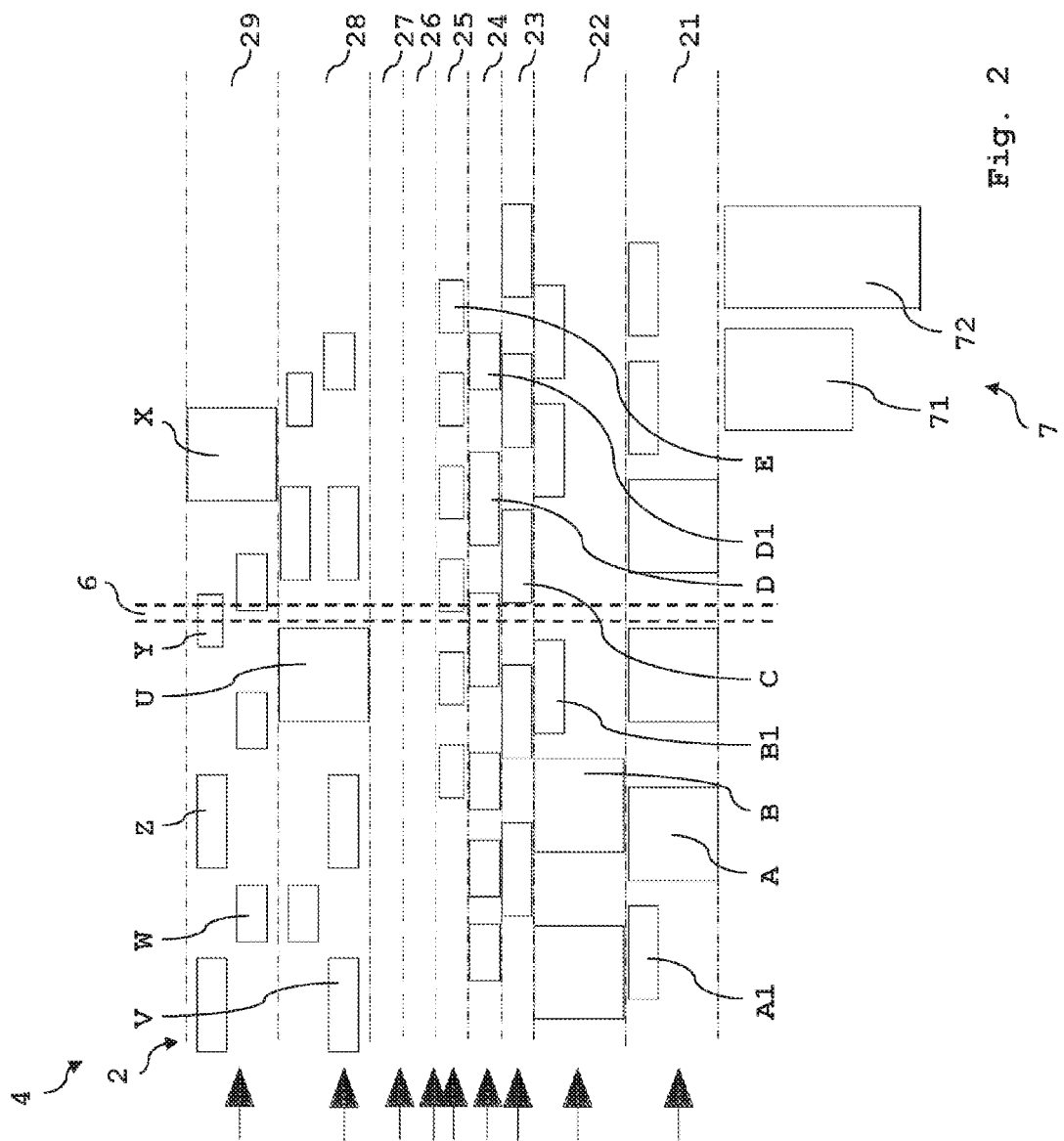
FIG. 2 is a top plan view of a portion of the conveyor system of the packaging plant of FIG. 1.

FIG. 2 shows a portion of the conveyor system 2 at the beginning of loading zone 4. The single conveyor belt of conveyor system 2 comprises a plurality of separate conveyance tracks for conveying different types of product packages. According to the embodiment shown in FIG. 2, conveyor system 2 comprises nine conveyance tracks 21, 22, 23, 24, 25, 26, 27, 28, 29. On each conveyance track 21-29 product packages of a specific type of contact lenses A, B, C, D, E, U, V, W, X, Y, Z is conveyed. The different types of contact lenses (one "type" of contact lens has one unique combination of lens parameters, including color), however, may be provided in product packages of different sizes. That is to say although product packages A, A1; B, B1; and D, D1 are of different sizes and contain different numbers of contact lenses, the contact lenses contained in product packages A, A1 on conveyance track 21 are identical, i.e. they have the same lens parameters. Or to say it in other words: Product packages A, A1 only differ in the number of contact lenses contained therein. Similarly, this holds for product packages B, B1 on conveyance track 22, and also for product packages D, D1. Thus, while the product packages on each of the conveyance tracks 21, 22, 24 are of different sizes, all product packages on one conveyance track contain contact lenses having the same lens parameters.

In the embodiment shown in FIG. 2, conveyance tracks 21-24 are reserved for product packages containing uncolored contact lenses of the types A-D having the most common combinations of lens parameters, for which there exists a high demand and which are ordered most frequently. On conveyance track 25 product packages E containing colored contact lenses are conveyed. Conveyance tracks 26, 27 are shown empty, but may serve as a reserve for the transport of additional product packages containing most frequently ordered contact lenses. On conveyance tracks 28, 29 product packages containing contact lenses of the types U-Z with less common combinations of parameters, which are demanded only less often (and, consequently, they are less frequently ordered).

Packaging plant 1 further comprises a conveyor tracking unit (not shown) for assigning each one of the product packages A, B, C, D, E, U, V, W, X, Y, Z a conveyance tracking clock information, which includes information about the type of the product package (that is to say about the number of contact lenses contained in a package and the lens parameters of the contact lenses contained in the respective package), the respective conveyance track on which the product package is conveyed, the conveyance speed, and the position and orientation within a shipment container of a suitable size for the specific order, into which container the product package is to be placed. The conveyance tracking clock information is assigned to a package of contact lenses at the time the package is loaded onto the conveyor system 2 (see reference numerals 31-35 in FIG. 1), and is forwarded to a control system for controlling all components of the packaging plant.

A detector 6 (indicated by hatched lines in FIG. 2) is arranged to extend transversely to the direction of conveyance over the entire width of conveyor system 2, and serves for detecting the exact positions and rotational orientations of the product packages on the conveyor system, as well as for passing data corresponding to the detected positions and orientations to the control system (not shown) for controlling the loading of the packages into the shipment containers 71, 72 in accordance with the respective orders. Detector 6 is arranged upstream of loading zone 4 before the first loading station 5. For example, detector 6 may comprise a CCD camera extending over the entire width of the single belt of conveyor system 2. The correspondingly marked shipment containers 71, 72 are arranged in a loading position in side-by-side configuration in loading station 5. The loading operation is described in more detail below.

Although not explicitly shown in the drawings, scanning devices may be present which are capable of detecting an information on the product package (e.g. in form of a bar-code) not only about the number and the parameters of the specific contact lenses contained in each product package but also on the production lot number and the expiry date. Thus, it is possible to detect and double-check whether the product package actually contains contact lenses belonging to a particular order (with respect to both the parameters and the number of contact lenses) to which the shipment container into which the product package is to be placed corresponds. Also, it is possible to detect and double-check whether the product packages contain contact lenses of a lot that has been blocked from getting distributed. And, additionally, it may be detected and double-checked that the actual date of distribution is well before the expiration date so that there is a sufficient period of time left before the expiration date. These data can be archived after the pick-and-place robot has picked the respective product package from the conveyor and has placed it into the respective shipment container so that in the extremely rare case of a recall these data can be retrieved from a database.

Figure 3:
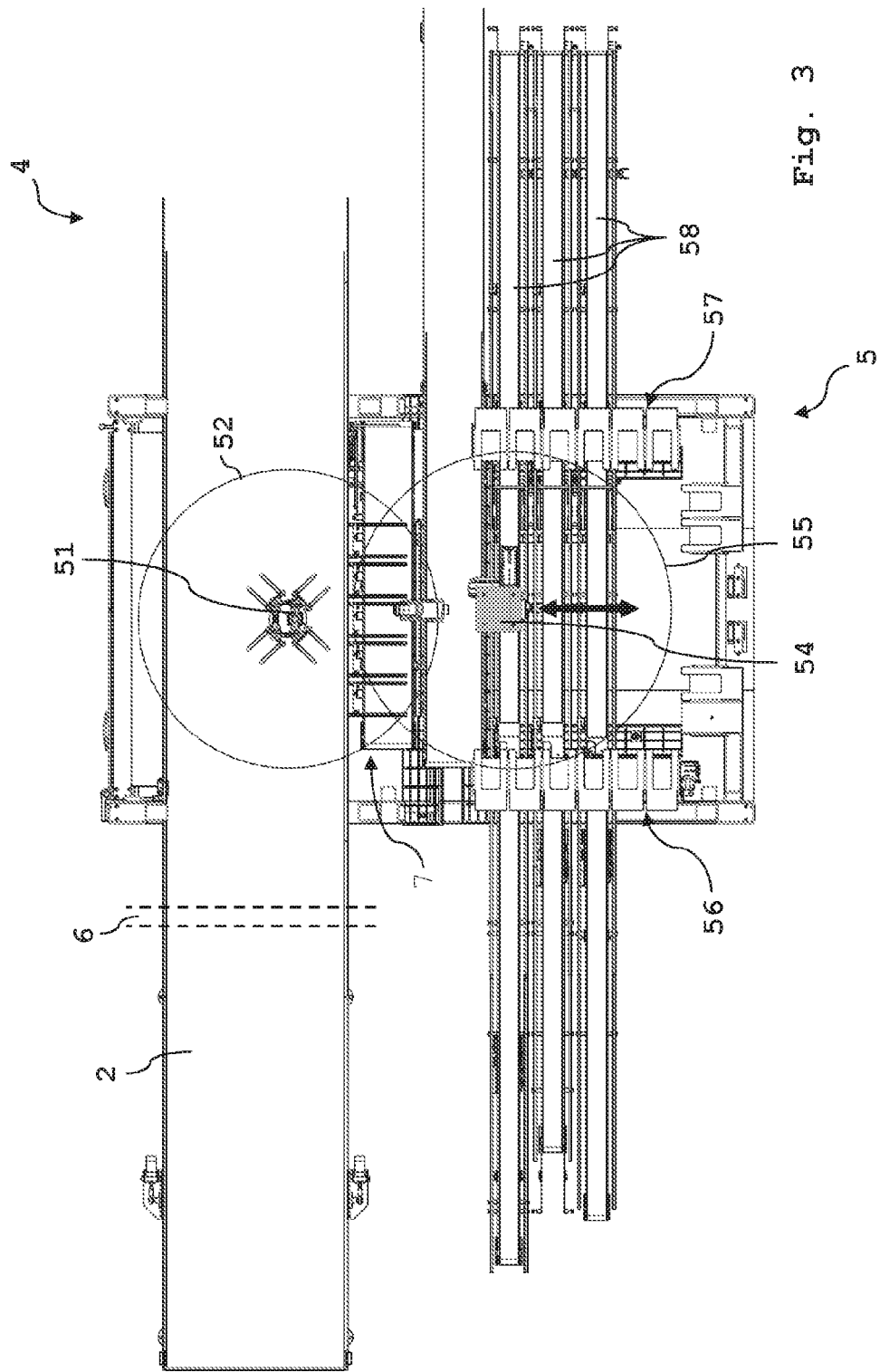
FIG. 3 is a detail of the loading zone showing one loading station of the packaging plant of FIG. 1.

In FIG. 3 a detail of the loading zone 4 of the packaging plant is shown. Three loading stations 5 of loading zone 4 are represented which are successively arranged. Again, detector 6 is indicated by hatched lines and is located upstream of the loading zone 4 before the first loading station 5. Each loading station 5 has the same configuration and comprises a pick-and-place robot 51 which is arranged above the single conveyor belt of conveyor system 2. The pick-and-place robot 51 which is controlled by the control system, picks the product packages containing the contact lenses from the single belt of conveyor system 2 as they are transported through the loading station 5 and places them into the respective shipment container five of which are shown arranged in side-by-side configuration in the loading position 7 in the respective loading station 5. Circle 52 indicates the range of reach of pick-and-place robot 51. The shipment containers may have different sizes. The size of the respective shipment container is selected in accordance with the corresponding order, and the container is marked accordingly.

The pick-and-place operation performed by the pick-and-place robot of the contact lens packages is controlled by the control system, which is in hold of the conveyance tracking clock information, which includes information about the type of product package (including information about the number and the parameters of the contact lenses contained in the respective product package), the respective conveyance track, the conveyance speed, and the predetermined position and orientation within a respective shipment container of preselected size. This information together with the data obtained from detector 6 about the actual position and rotational orientation of each product package on the conveyor system 2 enables the pick-and-place robot 51 to pick the respective product package, rotate it to the predetermined orientation within the shipment container of the corresponding shipment order, and place the product package with the desired orientation into the corresponding shipment container in accordance with the respective shipment order.

As can be seen further from FIG. 3, each loading station 5 further comprises an automatic manipulation robot 54. The automatic manipulation robot 54 may be embodied, for example, as a multiple-axes robot, preferably a six-axes robot, and is arranged in the respective loading station 5 at a distance from the single belt of conveyor system 2 which is greater than that of the loading position 7 for the shipment containers. The automatic manipulation robot 54 is arranged in reach of both the shipment containers in the loading position and of intermediate storages, which can be embodied as racks 56, 57 and which are also arranged in the respective loading station 5. Circle 55 indicates the range of reach of the automatic manipulation robot 54. Racks 56, 57 contain storage positions for empty or non-completed shipment containers of different sizes. For example, racks 56, 57 may contain empty shipment containers, which have been selected and marked in accordance with respective shipment orders to be processed. The empty shipment containers are supplied, for example, from an automatic carton folding station (not shown) outside loading station 5. Racks 56, 57 may also contain non-completed shipment containers, which do already contain some product packages of a shipment order but not all product packages of the shipment order. Such non-completed shipment containers are stored temporarily in racks 56, 57 by moving them from the loading position to the racks 56, 57 for temporary storage. This may occur if not all ordered types of contact lenses can be loaded onto the conveyor system and conveyed to the loading station within a predetermined time period, so that the time until the product package containing the missing type of contact lenses is loaded onto the conveyor system can be used to either partially or fully complete another shipment container in the loading position 7 with product packages which have already been placed onto the conveyor system 2 or which can be placed onto the conveyor system in a shorter time period. For example, such situation may occur when a product package containing a specific type of contact lenses must be provided from a remote storage facility. From the rack 56, 57 where the shipment container has been placed in an intermediate storage position, the shipment container is transferred back again to the loading position once the missing contact lens package(s) are loaded onto the conveyor system.

Figure 4:
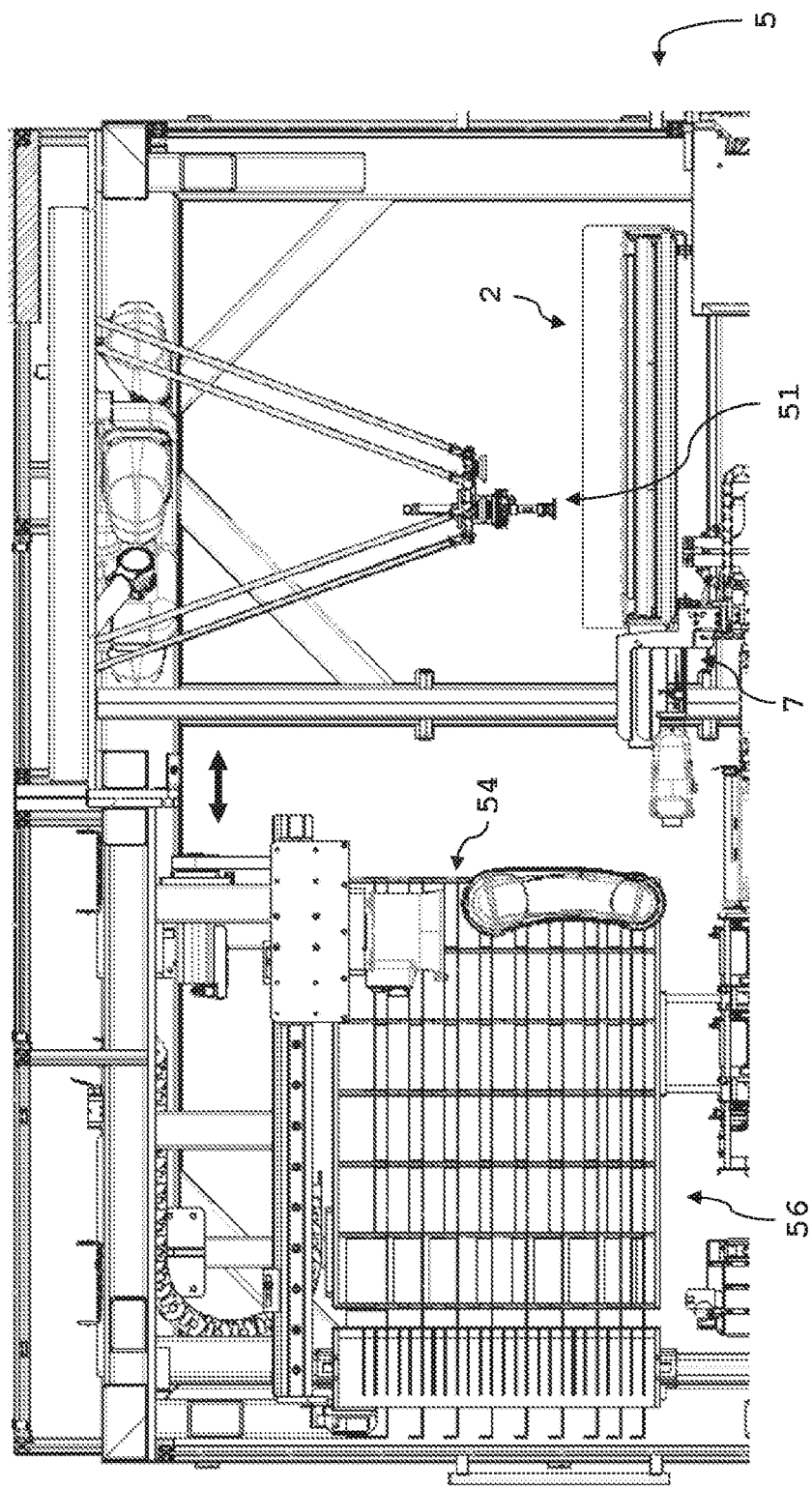
FIG. 4 is a more detailed view of the loading station of FIG. 3.

In FIG. 4 a loading station 5 is shown in a more detailed view. A portion of the loading station 5 has been cut away in order to get a better view at the interior of loading station 5. Therefore, when compared to FIG. 3 storage rack 57 is missing. The conveyor system 2 comprises the single conveyor belt, from which the product packages can be picked and placed into the shipment containers arranged in the loading position 7 by means of the pick-and-place robot 51. The automatic manipulation robot 54 depends from the top of the loading station 5 and is in reach of the shipment containers resting in the loading position 7. With the aid of manipulation robot 54, it is possible to transfer a non-completed shipment container from the loading position 7 to the storage racks (only rack 56 being visible) into an intermediate storage position, and vice versa. Also, empty storage shipment containers can be transferred from the racks (only rack 56 being visible) to the loading position to execute an order by picking the respective product packages from the conveyor belt of conveyor system 2 and placing them into the respective empty shipment container. Once a shipment order is completed, meaning that all product packages of the shipment order have been placed into the shipment container, the corresponding shipment container can be placed onto one of the belts 58 arranged below the racks for transporting the completed shipment container away from the loading station 5 and from loading zone 4 for further processing. For example, a delivery notice and/or an invoice and/or other suitable information may be placed into the shipment container prior to closing the container by placing a lid onto the container and securing the closed container against inadvertent or unauthorized opening. The closed container may also be provided with additional printings etc. prior to being shipped.

The method and the apparatus for placing product packages into shipment containers of varying sizes according to the invention allows an automatization of the packaging process for the majority of shipment orders. The invention addresses the objects of automatically packaging shipment containers in accordance with respective shipment orders and at the same time optimizing the required and available volumes of the shipment containers. This automatization and optimization is achieved in spite of an apparently chaotic supply of product packages.

The method and the packaging plant for placing product packages into shipment containers of varying sizes according to the invention are applicable for the majority of shipment orders. The automated packaging method and packaging plant provide relief to the packaging personnel and they allow for placing specific product packages exactly at the position within the shipment container which was predetermined by packaging simulation and optimization analysis. Thus, a pick-and-place robot in a loading station not only picks product packages from the conveyor system in order to empty the latter, but the pick-and-place process is performed in a specific and predetermined manner unique to a specific shipment order. This includes the selection of the suitable size of shipment container, an optimized utilization of the available space within the shipment container and of the time required for the packaging of the shipment container, which rests still during the packaging process. It is to be noted that the pick-and-place robot within a loading station may be capable of loading a plurality of different shipment containers which have been selected and marked in accordance with different shipment orders and rest in side by side configuration within the loading station. Likewise, the automatic manipulation robot is capable of transferring and replacing any one of those shipment containers, as need may be. Because each pick-and-place robot is capable of loading a plurality of different shipment containers quasi-simultaneously, and the manipulation robot is capable of reaching each one of the plurality of loading containers if need be, the efficiency of the loading process may be increased considerably.

The invention has been described by way of an exemplary embodiment only—it is not intended to limit the scope of the invention to the embodiment described. The invention provides a number of advantages. By providing a number of conveyance tracks on the conveyor system, each type of product package can be loaded onto a specific conveyance track. By assigning each product package a conveyance tracking clock information, including information about the type of product package, its respective conveyance track, its conveyance speed, its predetermined position and orientation within a shipment container of the specific shipment order, and, in case of a loading zone comprising more than one loading station, additional information about the loading station in which the automatic picking and placing of the product packages for a specific shipment order into a preselected shipment container will be performed, the task of a unique, optimized packaging of a shipment container for a specific shipment order may be performed in contrast to a chaotic supply of product packages. The conveyance tracking clock information, which has been assigned to each product package loaded onto the conveyor system, is forwarded to a control system. Thus, the pick-and-place robot within a loading station may be provided with the required data before a specific product package enters the respective loading station. The plurality of conveyance tracks may be loaded automatically or manually onto the conveyor system. In a preferred embodiment of the invention a plurality of the conveyance tracks is supplied automatically with the most common types of product packages (which are ordered most frequently). By reserving at least one of the conveyance tracks for types of product packages which are only required rarely, also more "exotic" shipment orders may be accomplished automatically.

The detector, which is arranged upstream of the loading zone, before the first loading station may serve for a final control of the exact position and rotational orientation of a product package before it is actually picked by the pick-and-place robot within the loading station and placed into a shipment container with the desired orientation. In case a shipment order may not be completed within a predetermined time period, for example because a specific product package is not available on the conveyor system within such predetermined time period (e.g. this product package must be retrieved from a remote storage facility), the invention provides for an intermediate storage of the non-completed shipment container. A manipulation robot within the loading station transfers the non-completed shipment container from the loading position to an intermediate storage position, for example in a rack, wherefrom it is transferred back again into the loading position once the missing product package (s) are loaded onto the conveyor system.

While not being shown in the drawings, a further advantageous aspect that may be present in any embodiment of the method and packaging plant according to the invention is the presence of scanning devices which are capable of detecting an information on the product package (e.g. in form of a bar-code) about the parameters of the ophthalmic lens or lenses contained in each product package as well as on the production lot number and on the expiry date of the ophthalmic lenses. Thus, it is possible to detect and double-check whether the product package actually contains ophthalmic lenses belonging to a particular order to which the shipment container into which the product package is to be placed corresponds. Also, it is possible to detect and double-check whether the product packages contain ophthalmic lenses of a lot that has been blocked from being distributed. And, additionally, it may be detected and double-checked that the actual date of distribution is well before the expiration date so that there is a sufficient period of time left before the expiration date. These data can be archived after the information has been verified and after the pick-and-place robot has picked the respective product package from the conveyor system and has placed it into the respective shipment container so that in the extremely rare case of a recall these data can be retrieved from a database.

The method and the packaging plant for placing product packages into shipment containers of varying sizes according to the invention may generally be used for the packaging of various kinds of products which are packaged in product packages of different sizes and which are asked for in shipment orders in various distributions and combinations, including small consumer articles, medicines, etc. However, the invention is particularly useful for the packaging of ophthalmic lenses, in particular contact lenses. Shipment orders from ophthalmologists or opticians typically include varying numbers of contact lenses having different leans parameters. With the method and packaging plant for placing product packages into shipment containers of varying sizes according to the invention, the vast majority of such shipment orders may be performed fully automatically, thus relieving the personnel from arduous and monotonous labor, while at the same time avoiding human errors and mistakes.

It is obvious for the skilled person, that many changes and modifications can be made without departing from the scope of the present invention, which is not intended to be limited by the foregoing description, but rather the scope of protection is defined by the appended claims.

The invention claimed is:

1. A method for placing product packages each containing one or more products into shipment containers of different sizes, the method including the steps of:
   selecting and marking a shipment container of suitable size for a specific shipment order in accordance with the specific shipment order;
   loading different types of product packages each containing one or more products onto a conveyor system comprising a plurality of separate conveyance tracks;
   forwarding information of each respective product package including the type of product package, its respective conveyance track, its conveyance speed, and its predetermined position and orientation within the shipment container for the specific shipment order to a control system at the time the respective product package is loaded onto the conveyor system,
   conveying the different types of product packages on the plurality of conveyance tracks to a loading zone comprising at least one loading station each having a pick-and-place robot,
   providing the shipment container for the specific shipment order into which the product packages for this order are to be placed within the at least one loading station, the shipment container being arranged in a loading position in which the container is resting still,
   picking the product packages for the specific shipment order from the plurality of conveyance tracks and placing the product packages into the shipment container resting still in the loading position within the at least one loading station by means of the pick-and-place robot in accordance with the information in the control system, and removing the shipment container from the loading station after completion of the specific shipment order.

2. The method of claim 1, wherein within the at least one loading station a plurality of shipment containers for different orders are resting still in the loading position in side-by-side configuration at the same time, and wherein the pick-and-place robot picks the product packages from the plurality of conveyance tracks and in accordance with the respective shipment order places them into the corresponding one of the plurality of shipment containers resting in the loading position.

3. The method according to claim 1, wherein the different types of product packages to be loaded onto the conveyor system are retrieved from separate storage facilities in accordance with the respective shipment order, and are loaded onto the conveyor system (2) by one of automatic and manual loading.

4. The method according to claim 1, wherein the loading zone comprises a plurality of successively arranged loading stations, and wherein further the information of each one of the product packages comprises an additional information about that loading station of the plurality of successively arranged loading stations in which the automatic picking of the respective product package from the respective conveyance track and the placing of the product package into the shipment container for the specific order is performed.

5. The method according to claim 1, wherein prior to reaching the loading zone the exact position and rotational orientation of the product packages on the respective conveyance tracks are detected, and wherein data corresponding to the detected position and orientation of the product packages are passed on to the control system for controlling the picking and placing of the product packages to the respective shipment container for the specific order.

6. The method according to claim 1, wherein within the at least one loading station a said shipment container is transferred from the loading position to an intermediate storage position if within a preselected time period the said shipment container cannot be completed, and wherein the said shipment container is retrieved again at a later time from the intermediate storage position and is transferred back to the loading position for completion of the shipment container once the required product packages for completing the specific order are loaded onto the conveyor system.

7. The method according to claim 1, wherein each of the product packages contains a single one or a plurality of contact lenses, having the same specific combination of lens parameters.

8. The method according to claim 1, wherein each of the plurality of conveyance tracks has the same transport speed.

9. The method according to claim 8, wherein the plurality of conveyance tracks are provided on a single common conveyor belt.

* * * * *